March 9, 1965     H. R. SCHREINER     3,172,546
SIZE REDUCTION OF BIOLOGICAL SUBSTANCES
Filed May 19, 1961
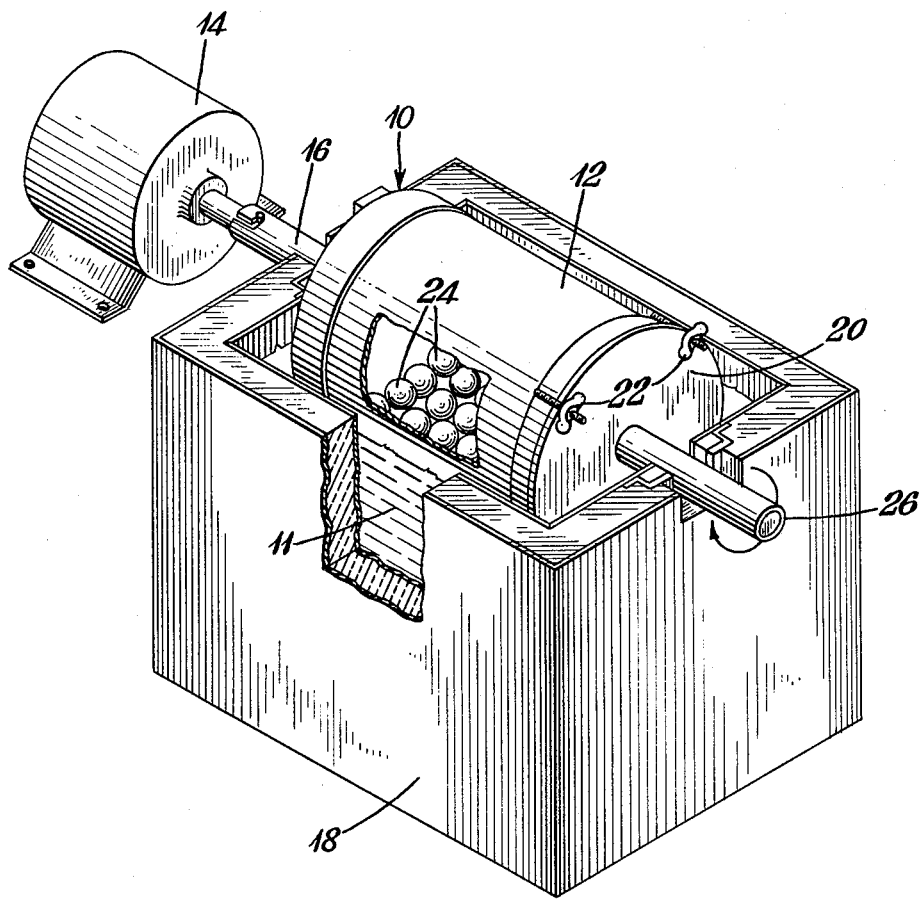
INVENTOR.
HEINZ R. SCHREINER
BY *William H. Mesinger*
ATTORNEY

United States Patent Office 3,172,546
Patented Mar. 9, 1965

---

3,172,546
SIZE REDUCTION OF BIOLOGICAL SUBSTANCES
Heinz R. Schreiner, Buffalo, N.Y., assignor to Union Carbide Corporation, a corporation of New York
Filed May 19, 1961, Ser. No. 111,237
5 Claims. (Cl. 241—23)

This invention relates to the size reduction of viable semi-solid biological substances, and more particularly to the size reduction of such substances without the loss of functional integrity.

As used herein, the term "semi-solid biological substances" refers to substances which do not perceptively flow and which are biologically reactive. Examples of these substances include organs such as the heart, kidney, liver, and the like, cells and tissues. Other examples are viruses, bacteria, and fungi. These substances may contain varying quantities of water and other liquids are frozen by the present method.

Size reduction of semi-solid biological substances is of technical and commercial importance for a number of reasons. For example, animal and plant tissues may be reduced in size to obtain a dispersion of intact individual cells for tissue cultures and the production of vaccines and other pharmaceutical products. Also, the size reduction of food materials provides nutrient preparations containing the fully preserved native biological activities of the source material. Another use of size reduction is to render materials accessible to biological, chemical, physical or mechanical analysis.

Still another use is to prepare subcellular particles such as mitochondria, cell nuclei, and the like and molecular species such as nucleic acids and proteins, especially reactive proteins such as enzymes, from biological materials.

The prior art has achieved the destruction of the cellular integrity of biological source material by a variety of means, as for example by grinding, sonic oscillation or enzyme attack on the cell membranes.

There are numerous occasions, however, where hitherto known methods fail to accomplish the complete liberation of biologically functional materials due to superior mechanical or chemical stability of cell membranes or because the disintegration process may destroy the biological function of the desired material.

An object of this invention is to provide a method for the size reduction of biological substances which are normally difficult to disintegrate due to high mechanical or chemical stability.

Another object is to provide an improved method for the size reduction of biological substances without destroying the biological function of the desired material. A further object is to provide improved apparatus for the size reduction of biological substances.

Other objects and advantages of this invention will be apparent from the ensuing disclosure and appended claims.

The single figure is an isometric view looking downwardly on novel apparatus suitable for practicing the instant method, certain parts being cut away.

According to this invention, it has been discovered that these objects may be achieved in a remarkaby efficient manner by providing a chemically inert cryogenic liquid having a boiling point below about $-130°$ C. at atmospheric pressure, and surrounding the biological substance with the cyrogenic liquid at below the recrystallization temperature of ice during the size reduction. The particulated biological substance may then be stored indefinitely at this temperature level without detrimental effects.

At normal atmospheric pressures, the recrystallization of ice begins at about $-130°$ C. for pure water. The presence of sugars, proteins, and the like in solution raises this initial temperature. Recrystallization of ice, i.e., conversion of cubic or vitreous ice to hexagonal ice, implies the occurence of molecular movement. Diffusion processes are taking place which are indicative of ionic movement and interaction which, in turn, has a proven deleterious effect on the molecular structure of many biologically active materials. Processing and storage of the chilled biological materials at temperatures below the recrystallization region of ice reduces or essentially eliminates the physiochemical changes (ionic movement, crystal growth, resultant disturbance of physiochemical forces responsible for the structural integrity of biologically active macromolecules) occurring at temperatures about about $-130°$ C. It can thus be seen that the instant method permits size reduction of semi-solid biological substances without detrimental biological transformations.

Another advantage of this invention is that the cryogenic liquid renders the semi-solid biological substance brittle, and more easily particulated. Thus, substances which could not be reduced to the desired size by prior art systems due to superior mechanical or chemical stability may now be readily disintegrated to the desired extent. Moreover, less force is required by the present system than is needed by prior art schemes to obtain a required degree of size reduction.

The increased brittleness of biological substances at liquid nitrogen temperatures as compared to solid $CO_2$ temperatures was demonstrated by the following tests:

The small intestines of a freshly sacrificed rabbit were removed, cleaned with running water and allowed to stand overnight in physiological saline at $4°$ C. Next morning 50-mm. segments of this tissue were frozen in liquid nitrogen ($-196°$ C.) and Dry Ice (solid $CO_2$, $-78°$ C.), respectively. Brittleness was determined by impact testing as follows: a frozen specimen was suspended on each end by placing it on two wooden supports 30 mm. apart. The end sections, measuring 10 mm. each in length, rested on these supports. A tungsten rod 2 mm. thick was centered vertically over the mid-point of the specimen. The lower end of this rod was positioned 3–4 mm. above the surface of the specimen. A weight of 1500 mg. (small hexagonal nut) was allowed to fall freely (guided by the tungsten rod which was placed through its center) from a measured height to impinge upon the test specimen. Specimens were removed from their cold environment and immediately subjected to this impact testing. The minimum height necessary to break the specimen on impact was recorded. The data obtained are as follows:

MINIMUM IMPACT FORCE NEEDED TO BREAK 50-MM. SECTIONS OF FROZEN RABBIT INTESTINE AS A FUNCTION OF TEMPERATURE

| Experiment | Force in gm. cm. | |
|---|---|---|
| | At $-78°$ C. | At $-196°$ C. |
| I | 47 | 25 |
| II | 47 | 25 |
| III | 41 | 23 |

Not only was the impact force necessary to break sections frozen at $-78°$ C. almost twice as great as the force needed to break sections frozen with liquid nitrogen, but there was a remarkable qualitative difference in the nature of the break as well. The "Dry-Ice" sections simply broke in two when the impact was sufficiently high; the "liquid nitrogen" sections shattered, glass-like, into many pieces when impacted with minimal breaking force.

Chemically inert cryogenic liquids suitable for employment in this invention include, nitrogen, helium, neon, argon, and krypton. Nitrogen is preferred since it is relatively inexpensive, being obtainable in large quantities by the well-known rectification of air. It also has an exceedingly low boiling point, namely—196° C. at atmospheric pressure. For this reason, the invention will be described specifically in terms of liquid nitrogen refrigeration. It will be recognized, however, that the choice of cryogenic liquid is effected by the system at hand and especially by the nature and intended use of the particulated biological substance.

Any of the well-known methods of size reduction may be employed, the basic requirement being the adaptability to functioning on the biological substance while the latter is surrounded by the cryogenic liquid. Suitable size reduction methods include grinding, crushing, cutting, and the like in batch, continuous and closed circuit operation.

The biological substance may be surrounded by the cryogenic liquid in any convenient manner as for example spraying or immersion. The latter is preferred from the standpoint of efficiency and convenience.

A novel apparatus for practicing the method of this invention is illustrated in the single figure, and includes a rotatable cylindrical mill 10 constructed and arranged to be partly or completely submerged in a bath 11 containing a suitable cryogenic liquid. An insulated cover (not illustrated) of for example, expanded polystyrene, may be provided over mill 10 to reduce the cryogenic liquid consumption of the mill. The horizontal cylindrical chamber 12 is constructed of a high-strength material at low temperatures, as for example stainless steel. Cylinder 12 is connected to driving means such as electric motor 14 and shaft 16, the motor preferably having means for speed adjustment. Insulated container 18 receives rotatable cylinder 12, the two components preferably being sized so as to provide an annular space therebetween for free circulation of cryogenic liquid bath 11.

Removable end plate 20 is positioned and held against cylinder 12 by suitable retaining means such as bolt-and-nut assemblies 22. The biological substance, cryogenic liquid and the grinding medium 24 such as balls, rods, pebbles, and the like are charged into rotatable cylinder 12 by removing and replacing end plate 20. Conduit 26 extends through end plate 20 and communicates between cylinder 12 and the atmosphere, thereby permitting escape of vaporized cryogenic liquid during rotation and grinding. If necessary or desirable, additional make-up cryogenic liquid may be introduced to cylinder 12 during the grinding operation by means of a small diameter conduit (not shown) extending through conduit 26 with an annular space therebetween for vapor escape.

In the processing of pathogenic or noxious materials which are likely to be aerosolized and carried out of the cylindrical mill 10 by the vaporized cryogenic liquid, suitable precautions should be taken to avoid the contamination of the immediate surroundings. For example, when processing pathogenic materials, conduit 26 is preferably fitted with a bacteriological filter such as a cellulose nitrate or cellulose butyrate filter membrane with pore sizes of less than about 0.4 micron. Similarly, for the processing of noxious materials conduit 26 may be connected, preferably by a tetrafluoroethylene resin gland such as those sold commercially under the name Teflon, to suitable ducting for ventilation purposes. Glands formed of Teflon avoid sticking or "freezing" at cryogenic liquid temperatures. Conduit 26 and shaft 16 should be supported on bearings which will not bind or "freeze" at cryogenic liquid temperatures. Here again tetrafluoroethylene bearings are particularly well suited.

Rotation of the cylindrical chamber causes the grinding medium 24 to rise with the rising side until the arrangement becomes unstable and much medium cascades to the foot of the slope. Grinding is due to the cascading and movement of the grinding medium 24 upon each other and upon the walls of the cylinder 12. The critical speed, i.e. the speed at which centrifugal forces cause the grinding medium to arrange itself along the walls of the cylinder depends on the inside diameter of the milling cylinder 12. Consequently the rotational speed should be less than the critical speed to avoid suspension of the grinding medium against the cylinder walls and non-particulation of the biological substance. The following Table I lists the critical speed for various cylinder inside diameters.

Table I

| Critical Speed, r.p.m.: | Cylinder inside diameter ft. |
| --- | --- |
| 24 | 10 |
| 27 | 8 |
| 31 | 6 |
| 38 | 4 |
| 54 | 2 |
| 75 | 1 |

The pressure of the cryogenic refrigerating liquid inside the milling cylinder appears to have a negligible effect on the critical speeds.

The invention is further illustrated by the following examples:

EXAMPLE I.—PREPARATION OF HIGH POTENCY HOMOGENIZED LIVER PREPARATIONS FOR DIETARY USE

Chunks of calf liver measuring approximately ½ to 1-inch in size are placed in a ball mill cylinder similar to that illustrated in the figure, along with 1-inch diameter stainless steel balls and a charge of liquid nitrogen. Liquid nitrogen is charged until an adequate quantity of the refrigerant remains in the cylinder after vigorous boiling of the refrigerant has ceased. In this manner the cylinder is cooled to about —196° C. The milling cylinder is then completley submerged in a liquid nitrogen bath and milling is commenced at 85% of the critical speed of the cylinder. This method yields a frozen homogenized powder of calf liver which retains its original levels of vitamins, enzymes and other sensitive biological components. This powder may be stored at —196° C. in the liquid nitrogen for indefinite periods of time and will thereby retain its nutritional wholesomeness for eventual use.

EXAMPLE II.—XENON ANALYSIS OF RAT TISSUES

The concentration of carbon dioxide, nitrogen or other gas in animal or plant tissues may be determined by employing the instant method. This is illustrated by one experiment in which a laboratory rat is permitted to inhale a gas mixture containing xenon and thereafter instantly killed by submersion in liquid nitrogen. The rapid cooling of the animal carcass to the boiling point of nitrogen prevents diffusion and escape of the xenon dissolved in the tissues. The ultra-cold carcass is disected mechanically and selected tissues are crushed in a ball mill under liquid nitrogen, such as that shown in the figure. The powder obtained is transferred without warming into a suitable analysis vessel. On heating, xenon is released quantitatively from the tissue and may be analyzed by mass spectroscopy.

The analysis of gases dissolved in animal tissues is of great importance for many areas of scientific research, and also for human response applications. For example, investigations of unexplained airplane crashes often center around the physiological state of the pilot before the accident. Concentrations of gases such as carbon monoxide in the tissues of the pilot give important clues to his pre-accident capability to react. Concentrations of carbon monoxide are routinely determined in such cases by analyzing speciments taken from the remains of the pilot.

In physiological research the distribution of gases in the various tissues of an animal at precisely known time intervals after inhalation gives important clues to the transport and utilization or effect of these gases. The example given relates to the analysis of xenon (or any other gas) as it becomes distributed among the organs of a laboratory rat. This is the only method known to applicant which makes it possible to "freeze" the gaseous concentration throughout the body of the animal and to maintain it localized until an analysis can be performed. The same idea applies to research applications where short-lived biochemical intermediates are to be observed in a laboratory animal following the introduction of a chemical. Ultra-rapid freezing of the experimental animals again permits removal of portions of the carcass with the short-lived biochemical intermediate present, without change, until analysis can be performed.

EXAMPLE III.—PREPARATION OF VIABLE FROZEN KIDNEY CELLS

A rabbit kidney was perfused with a glycerol-saline solution in situ and frozen in liquid nitrogen vapor. The calyx was removed from the kidney. The kidney was then ball-milled by the method of this invention. The experimental conditions and the obtained results are summerized in the following table:

| Milling Conditions | Results of Microscopic Observation | | | |
|---|---|---|---|---|
| | Intact Tissue | Discrete Cells | Live Cells | Fragments |
| Material was crushed with mortar and pestle. | Large pieces | Many | None | Present. |
| Crushed material ball milled for 5 min. at 45 r.p.m. | Small pieces (5-20 cells) | do | 3% | Do. |
| Milling time at 45 r.p.m., 10 min. | Small pieces (5-10 cells) | Few to many | 3% | Do. |
| 15 min | Small pieces (very few cells) | do | 2% | Do. |
| 30 min | Absent | Very few | None | Abundant. |
| 60 min | do | None | do | Do. |

The viability of the cells was determined by vital staining. A double stain, eosin B and fast green FCF, was employed. These compounds being described more fully in the Encyclopedia of Microscopic Stains, pages 184 and 195, published by Williams and Wilkins Co., Baltimore, Md. (1960). Fast green FCF is not absorbed by either living or dead cells and serves to provide a suitable background against which to assess the viability of the cell preparation. Eosin B stains dead cells reddish purple whereas the live cells appear clear. The cell suspension was diluted with an equal volume of the double stain, smeared on a slide, dried, and counted under high magnification (430X).

The double stain was prepared as follows:

1 gram fast green FCF ($C_{37}H_{34}N_2O_{10}S_3Na_2$)
200 gram eosin B ($C_{20}H_6O_5I_4Na_2$)

Dissolve the above in 50 ml. of M/8 phosphate, buffer, pH 7.4.

As indicated by the experimental results, the expedient of crushing the frozen material did not produce viable cells; however, live cells were obtained by grinding the frozen kidney while surrounded by liquid nitrogen. Since this experiment was intended to demonstrate the feasibility of obtaining live cells by the cryogenic size reduction process of this invention no attempts were made to maximize the live cell yield. The main factors which determine the yield of live cells are the initial size of the individual pieces ground, the severity of the size-reducing impacts applied, and the duration of application of said impacts.

EXAMPLE IV.—LIBERATION OF THE ENZYME NITRATE REDUCTASE FROM THE MOLD *NEUROSPORA CRASSA* 5297A

The mycelial filaments of the organism are extremely tough and difficult to disrupt, and the enzyme is sensitive to heat, surface action and air oxidation, characteristics shared by many biological materials. Pressed and frozen mycelial pads each weighing 100 grams were prepared and charged along with 28 stainless steel balls of 1-inch diameter into a rotatable cylinder similar to that illustrated in the figure and measuring 6.5 x 7.5 in. (I.D.). Liquid nitrogen was introduced until the violent boiling had subsided. The rotatable cylinder was closed with a vented face plate and placed in a liquid nitrogen bath. A transmission with a speed range of 0 to 675 r.p.m. driven by a ¼ H.P. electric motor was used to rotate the cylinder at 54 r.p.m. Milling of a full charge was 90% completed in 30 minutes.

At the end of each run, the contents of the cylinder were emptied into a wide-screen steel-wire basket partially submerged in liquid nitrogen. On shaking the basket a powdery material collected in the liquid nitrogen bath. It may be stored at this temperature for an unlimited period of time without losing its biological properties, or it may be thawed and its enzyme content extracted.

The experimental results are shown below:

| | Mg. Protein | Content of 100 ml. of Extract | |
|---|---|---|---|
| | | Units of Enzyme Activity | Specific Enzyme Activity |
| Conventional grinding technique at ambient temperature | 900 | 79,000 | 88 |
| Cryogenic size reduction | 1,160 | 159,000 | 137 |
| Improvement, percent | 28 | 101 | 56 |

Disintegration of the same charge of *Neurospora crassa* by the commonly used technique of grinding in a Ten Broeck apparatus yielded an extract containing 9.0 mg. protein/ml. and 88 units of enzymic activity per mg. protein. Thus, ball milling in liquid nitrogen causes the subsequent release from the mycelial material of 28% more proteins and double the amount of nitrate reductase activity than does the conventional method.

A Ten Broeck grinder consists of two glass pieces, ground to close tolerances, which fit inside one another in the following fashion: a stationary shell of cylindrical shape, closed at the bottom and open at the top, where it is flared into a bowl-like shape. A cylindrical rotating grinder with a handle to fit the grip of a hand is provided. Grinding is accomplished by introducing a liquid suspension into the outer shell, followed by the insertion of the grinder, or piston. This piston is twisted by hand and pushed down at the same time. This forces the suspension up to pass between the ground glass surfaces of the piston and shell. Friction during this passage effects size reduction and homogenization. As the piston is forced down liquid containing homogenized or broken-up material collects in the aforementioned bowl from where it may be decanted into storage vessels.

EXAMPLE V.—LIBERATION OF THE ENZYME NITRATE REDUCTASE FROM THE MOLD *NEUROSPORA CRASSA* 5297A

The need for adequate contact between the biological substance and the cryogenic liquid is shown by the following unsuccessful experiment.

A vented ball mill cylinder was charged with stainless steel balls of ½ in. and ¾ in. diameter and a suspension of mycelia of the mold Neurospora crassa 5297A frozen in droplets by submersion into liquid nitrogen. Liquid nitrogen was introduced until the violent boiling had subsided. The container was then closed and rotated for two hours. At the end of this period the contents of the mill had reached room temperature. A greyish-brown liquid was recovered. Microscopic examination revealed broken mold cells and cell debris. The extract of this material failed to exhibit nitrate reductase activity, however.

This invention may also be employed in the extraction of other non-hydrolytic enzymes, i.e., enzymes which in their natural habitat generally function inside the cell, by suitable modification of the mold growth and enzyme purification steps. Such modifications will be readily apparent to one skilled in the art. In order to extract nonhydrolytic enzymes, it is necessary to rupture the cell wall. Typical non-hydrolytic enzymes which may be extracted by the instant method include those listed in Table II.

EXAMPLE VI.—PREPARATION OF CELL FRAGMENTS OF THE BACTERIUM *STAPHYLOCOCCUS EPIDERMIDIS*

A process for the preparation of cell fragments of the bacterium Staphylococcus epidermidis suitable for serological and immunological use is described in the following example:

The microorganism Staphylococcus epidermidis (ATCC 155) was grown in agitated cultures at 37° C. for 24 hours. The growth medium had the following composition.

Beef extract _____ g__ 2.0
Peptone _____ g__ 3.4
Brain-heart infusion _____ g__ 5.0
Tryptose _____ g__ 5.0
Sodium chloride _____ g__ 2.5
Glucose _____ g__ 0.25
Distilled water to give 1.0 liter; pH 7.2.

Two liters of a 24-hour culture were centrifuged at 20,000 times the gravitational acceleration for 15 minutes. The precipitated cells were suspended in 0.85% sodium chloride solution and recentrifuged. The washed cells were collected and suspended in 2.5 molar glucose solution containing 0.85% sodium chloride, to give a volume of 4.1. The resulting thick greenish-white slurry, containing several hundred billions of live bacterial cells was frozen by dropwise immersion in liquid nitrogen. A rotatable cylinder similar to that illustrated in the figure and measuring 6.5 x 7.5 in. (I.D.) was charged with the frozen suspension, 24 stainless steel balls and liquid nitrogen. Ball milling commenced at 42 r.p.m. for 60 minutes. At the end of the run the charge, reduced to a fine powder, was removed from the walls of the milling container with a pre-chilled spatula and transferred to stor-

*Table II—Non hydrolytic enzymes*

| Name (Source) | Function | Use |
|---|---|---|
| Glucose oxidase (mold cells). | Desugarize by specifically oxidizing glucose in the presence of oxygen to gluconic acid. | Stabilization of flavor concentrates. With catalase stabilizes egg. solids, removes oxygen as deteriorant in packaged food. |
| Catalase (mold and animal cells). | Specifically decompose hydrogen peroxide into water and oxygen. | Food preservation, especially dairy foods. Also used with glucose oxidase (see above). |
| Lipoxidase (plant cells) | Catalyzes autooxidation of unsaturated fats, forming hydroperoxides which oxidize carotene. | Whitening of bread. |

Common source microorganisms for glucose oxidase and catalase are *Penicillium notatum* and *Aspergillus niger*.

Other processes where cell wall rupture by the method of this invention may be advantageously applied are the production of hormones, vaccines and isotopically labeled compounds. In the production of hormones, for example, insulin may be prepared by grinding up the pancreas so as to rupture the individual cells and extracting the hormone. In the same manner, ACTH (adrenocorticotropic hormone) may be obtained from the pituitary glands.

The process of this invention may also be applied to the manufacture of vaccines. For example, in the case of pathogenic organisms such as *Pneumococcus* and *Hemophilus pertussis*, the cells of which possess a hard capsule, said cells may be ground up and the disintegrated cell constituents injected in a suitable animal or human circulatory system. This system, then produces anti-bodies to all of the antigents present; whereas, if the cell had remained intact, only anti-bodies to antigens on the cell exterior would be produced.

age at −196° C. Aliquots of this powder were removed for microscopic and bacteriological examination. Under the microscope much debris and many fragmented cells were seen. Bacteriological assay showed a concentration of 11.7 million live cells per mg. of milled sample after thawing in a thin-walled aluminum container submerged in a 45° C. water bath. A control sample frozen in liquid nitrogen and thawed in an identical manner showed a live cell content of 114 million cells per mg. sample. This amounts to 90.25% efficiency of the instant cryogenic size reduction method in disintegrating the cellular structure of Staphylococcus. The milled sample obtained possesses the unaltered immunological properties of the native cell. Thus, the following procedures may be followed to prepare antigenic material for vaccine production from the ground sample:

(1) Inactivation of the live cells with formaldehyde at a concentration low enough so as not to interfere with the biological functionality of the cell fragments. This approach is widely used by the pharmaceutical industry.

(2) Separation of live cells from cell fragments on the basis of their mass by fractional sedimentation procedures in the centrifuge.

(3) If only water-soluble cell fragments are desired, removal of intact cells and large cell fragments may be effected by ultrafiltration.

Electronmicroscopic examination of the ground material revealed the following ratios of broken to unbroken cells;

Observation:
  I _____ 7:1
  II _____ 11:1
  III _____ 10:1

Average _____ 28:3

Percentage of cells broken—

$$\frac{28}{18+3} \times 100 = 90.5\%$$

The broken Staphylococci appeared as empty, torn, membranous sacs under the electronmicroscope. Their appearance bore a certain resemblance to a banana peel. This constitutes evidence for the effective removal of the cell contents and the exposure of the inner lining of the cell mambrane as a result of cryogenic size reduction.

The hereinabove-described process is equally well applicable to microorganisms such as *Staphylococcus aureus* var. Albus, Pneumococcus, *Hemophilus pertissis*, and the like.

Moreover, isotopically labeled compounds may be produced in this manner. For example, carbon 13, nitrogen 15, heavy hydrogen, oxygen 17 are "fed" to microorganisms which incorporate it into the food stored within the cell. These cells may then be disintegrated and the labeled compounds recovered. Specific compounds obtainable in this manner are proteins, lipoproteins, carhohydrates and lipid materials.

EXAMPLE VII.—GRINDING OF BONES

The cryogenic size reduction method of this invention is also suitable for ground bone preparations suitable for treating the effects of X- and gamma radiation. The ground bone is usually injected intraperitoneally. An example illustrating the grinding of bones is provided below.

Ribs were obtained from a freshly sacrificed adult rabbit. The ribs were cracked slightly and allowed to equilibrate overnight at 4° C. in a salt-glycerol (15%) solution. The ribs were frozen by immersion in liquid nitrogen. One frozen rib was retained at −196° C. as control; the remainder was crushed in a mortar and pestle pre-chilled to −196° C. The crushed material was milled for 1 hr. at 42 r.p.m. as disclosed above (see Example VI). At the end of the run the milled charge was milled for 1 hr. at 42 r.p.m. as discussed above (see on the basis of their particular size. "Fines" were scraped from the walls of the milling container while the coarse material was collected from the bottom of the milling drum.

All specimens were thawed by being introduced into 5 ml. of Hank's balanced salt solution maintained at 37° C. Live-dead staining of bone marrow cells was carried out with eosin B by a stain-exclusion technique (i.e., live cells do not take up the stain, as seen under the microscope). Cytological examination yielded the following results:

| Specimen | Speicmen Weight, mg. | No. of cells per microliter of suspension | No. of cells per mg. of bone | Percent Viability |
| --- | --- | --- | --- | --- |
| Whole rib, fresh [1] | 694 | 42,800 | 310,000 | 96 |
| Whole rib, frozen [1] | 544 | 36,400 | 340,000 | 58 |
| Coarse Particles (Rib), frozen [1] | 517 | 39,200 | 380,000 | 51 |
| Fine Particles (Rib), frozen | 522 | 23,400 | 235,000 | [2] 91 |

[1] To obtain a sample for microscopic examination marrow was scraped from these specimens as quantitatively as possible and transferred to the thawing solution.
[2] The great number of bone chips present made accurate counting impossible. The exact value is in doubt.

In this example, discrete cells are not produced from a coherent tissue. Bone marrow cells are already discrete in their native state. They are imbedded in a gelatinous, liquid matrix in the interior of the bone.

The milled material obtained may also be used to start the growth of cultured bone marrow cells in vitro. The bone marrow cells obtained by the method of this invention may then be separated from the bone fragments and transfused into recipients.

The method of this invention may also be applied in hematopoietic transplantations in humans using fetal tissue such as the liver and spleen. Human fetal liver and spleen are ground and used for transfusions.

As previously discussed, this invention is concerned with size reduction methods by means of which intact viable cells as well as cell fragments may be obtained. The conditions which determine the extent of the size reduction (i.e., reduction to cellular or subcellular particles) vary with the particular biological substance treated and generally are mechanical in nature. The main factors in this respect are the initial state of dispersion (i.e, the relative size of the individual pieces to be ground), the severity of the impacts applied, and the duration of the application of such impacts.

Since the biological materials processed according to this invention are in intimate contact with the cryogenic liquid refrigerant, in most instances it is desirable that the latter be sterilized prior to use, i.e., freed from any microorganisms and spores. This can be conveniently accomplished by filtering the refrigerant fluid through a porous cellulose-derivative membrane, as described more fully in copending patent application U.S. Ser. No. 63,680, filed on October 19, 1960, in the names of A. P. Rinfret and G. F. Doebbler. Moreover, in such instances the size-reduction apparatus should also be maintained under aseptic conditions. This may be easily accomplished by sterilization of the cylinder and the steel balls in a steam autoclave for 20 minutes at 15 p.s.i.g. steam pressure (121° C.)

Although preferred embodiments of the invention have been described in detail, it is contemplated that modifications of the method and apparatus may be made and that some features may be employed without others all within the spirit and scope of the invention.

What is claimed is:

1. In the size reduction of semi-solid biological substance, the improvement comprising the steps of providing liquid nitrogen as the only coolant, and surrounding the biological substance with the liquid nitrogen below the recrystallization temperature of ice during said size reduction.

2. A method according to claim 1 in which said biological substance is immersed in a bath of said liquid nitrogen.

3. A method for the size reduction of semi-solid biological substance comprising the steps of providing liquid nitrogen as the only coolant, surrounding the biological substance with the liquid nitrogen at a temperature below the recrystallization temperature of ice, and simultaneously grinding said biological substance at said temperature.

4. A method for the size reduction of semi-solid biological substance comprising the steps of providing liquid nitrogen as the only coolant, surrounding the biological substance with the liquid nitrogen at a temperature below the recrystallization temperature of ice, and simultaneously milling said biological substance at said temperature.

5. Apparatus for the size reduction of semi-solid biological substance comprising a container for holding liquid nitrogen as the only coolant; a rotatable cylinder arranged and constructed to be at least partially immersed in the liquid nitrogen-holding container; a grinding medium and removable closure means for inserting said grinding medium, said semi-solid biological substance and the liquid nitrogen in said rotatable cylinder; a conduit providing a gas venting means for said rotatable cylinder; and driving means for rotating such cylinder.

References Cited in the file of this patent
UNITED STATES PATENTS

| | | |
|---|---|---|
| 1,104,140 | Ross | July 21, 1914 |
| 2,609,150 | Bludeau | Sept. 2, 1952 |
| 2,919,862 | Beike | Jan. 5, 1960 |

OTHER REFERENCES

"A Low Temperature Ball Mill for the Liberation of Labile Cellular Products," by Stuart Mudd, in Public Health Reports, volume 52, Number 27, pages 887-892, July 2, 1937.

"The Extraction of Labile Bacterial Antigne by Disruption of the Bacterial Cells at Low Temperature," by E. J. Czarnetzky, Science, volume 84, No. 2181, pp. 355–356, October 16, 1936.